US 11,681,136 B2

(12) United States Patent
Kleppe et al.

(10) Patent No.: US 11,681,136 B2
(45) Date of Patent: *Jun. 20, 2023

(54) MICROSCOPE CONTROL METHOD AND MICROSCOPE

(71) Applicant: CARL ZEISS MICROSCOPY GMBH, Jena (DE)

(72) Inventors: Ingo Kleppe, Jena (DE); Rebecca Elsässer, Jena (DE); Philipp Schwesig, Jena (DE)

(73) Assignee: CARL ZEISS MICROSCOPY GMBH, Jena (DE)

(*) Notice: Subject to any disclaimer, the term of this patent is extended or adjusted under 35 U.S.C. 154(b) by 12 days.

This patent is subject to a terminal disclaimer.

(21) Appl. No.: 17/303,517

(22) Filed: Jun. 1, 2021

(65) Prior Publication Data
US 2021/0356728 A1 Nov. 18, 2021

Related U.S. Application Data

(63) Continuation of application No. 15/765,467, filed as application No. PCT/EP2016/073435 on Sep. 30, 2016, now Pat. No. 11,054,626.

(30) Foreign Application Priority Data

Oct. 2, 2015 (DE) .......................... 102015219121.4

(51) Int. Cl.
G02B 21/36 (2006.01)
G02B 21/24 (2006.01)
(Continued)

(52) U.S. Cl.
CPC ......... *G02B 21/24* (2013.01); *G02B 21/0012* (2013.01); *G02B 21/365* (2013.01);
(Continued)

(58) Field of Classification Search
USPC .......................... 704/246, 247, 251, 252, 275
See application file for complete search history.

(56) References Cited

U.S. PATENT DOCUMENTS 4,989,253 A 1/1991 Liang et al.
5,345,538 A 9/1994 Narayannan et al.
(Continued)

FOREIGN PATENT DOCUMENTS

AT 503305 B1 9/2007
DE 19640907 A1 4/1997
(Continued)

OTHER PUBLICATIONS

German Search Report for Application No. 102015219121.4, dated Jun. 2, 2016, 8 pages.
(Continued)

*Primary Examiner* — Leonard Saint-Cyr
(74) *Attorney, Agent, or Firm* — Brake Hughes Bellermann LLP

(57) ABSTRACT

A microscope control method for operating a microscope, includes: capturing an item of acoustic, graphically represented and/or electronically coded voice information; comparing the voice information with stored reference commands and determining a voice command on the basis of a predetermined degree of correspondence between at least one section of the voice information and a reference command; selecting that reference command to which the voice command corresponds at least to a predetermined degree; generating at least one control command suitable for operating the microscope, wherein the control command is either an invariable control command assigned to the selected reference command or the control command is generated on the basis of a rule assigned to the reference command for forming a generated control command, and controlling the microscope by means of the assigned or generated control
(Continued)

command. Also, a microscope is designed to carry out the microscope control method.

18 Claims, 2 Drawing Sheets

(51) Int. Cl.
  *G02B 21/00* (2006.01)
  *G05B 19/02* (2006.01)
(52) U.S. Cl.
  CPC .... *G05B 19/02* (2013.01); *G05B 2219/35453* (2013.01); *G06T 2207/10064* (2013.01)

(56) References Cited

U.S. PATENT DOCUMENTS

| | | | |
|---|---|---|---|
| 5,544,654 A | 8/1996 | Murphy et al. | |
| 5,982,532 A | 11/1999 | Mittelstadt et al. | |
| 7,286,992 B2 | 10/2007 | Sander et al. | |
| 8,165,876 B2 | 4/2012 | Emam et al. | |
| 2004/0034534 A1 | 2/2004 | Sander et al. | |
| 2005/0037406 A1 | 2/2005 | De La Torre-Bueno et al. | |
| 2008/0021711 A1* | 1/2008 | Claus | G16H 20/40 704/275 |
| 2008/0144170 A1 | 6/2008 | Takahashi et al. | |
| 2008/0301176 A1* | 12/2008 | Fanelli | G06F 16/93 707/999.102 |
| 2015/0198797 A1 | 7/2015 | Andre et al. | |

FOREIGN PATENT DOCUMENTS

| | | |
|---|---|---|
| DE | 19640907 B4 | 9/2005 |
| DE | 102012220195 A1 | 5/2014 |
| EP | 1376187 A1 | 1/2004 |
| JP | 09218354 A | 8/1997 |
| JP | 2000116670 A | 4/2000 |
| JP | 2003223184 A | 8/2003 |
| WO | 9715240 A1 | 5/1997 |
| WO | 2008011407 A2 | 1/2008 |
| WO | 2014009859 A2 | 1/2014 |

OTHER PUBLICATIONS

English Translation of International Search Report for PCT Application No. PCT/EP2016/073435, dated Dec. 7, 2016, 3 pages.
Krahmer, "The Science and Art of Voice Interfaces", Technical Report, Philips Research, Eindhoven, Netherlands, 2001, 58 pages.

* cited by examiner

200 capturing an item of acoustic, graphically represented and/or electronically coded voice information by means of a detector, an optical capture unit and/or an interface — 202 comparing the voice information with stored reference commands and determining a voice command on the basis of a predetermined degree of correspondence between at least one section of the voice information and a reference command — 204 selecting that reference command to which the voice command corresponds at least to a predetermined degree — 206 generating at least one control command suitable for operating the microscope, wherein the control command is either an invariable control command assigned to the selected reference command or the control command is generated on the basis of a rule assigned to the reference command for forming a generated control command — 208 controlling the microscope by means of the assigned or generated control command — 210

FIG. 2

MICROSCOPE CONTROL METHOD AND MICROSCOPE

CROSS REFERENCE TO RELATED APPLICATIONS

This application is a continuation of U.S. application Ser. No. 15/765,467, filed Apr. 2, 2018, which is a 35 U.S.C. § 371 National Phase Entry Application from PCT/EP2016/073435 filed Sep. 30, 2016, designating the United States, and also claims priority to German Application No. 10 2015 219 121.4 filed Oct. 2, 2015. The disclosures of all above-listed applications are incorporated herein by reference in their entireties.

TECHNICAL FIELD

The invention relates to a method for controlling a microscope and to a microscope suitable for carrying out the method.

BACKGROUND

In order to operate a microscope, it is usually controlled manually by operating elements of the microscope and/or by an operator of the microscope selecting control commands of a control program via a user interface, for example of a touch-sensitive display (touch pad) or a computer. The selected control commands are transmitted to the microscope by a control unit, whereupon the microscope is activated according to the transmitted control commands.

In this case, the user of the microscope must navigate through a menu of the control program and, under certain circumstances, only arrives at the desired control command after a multiplicity of selection operations. If the user is not familiar or is not very familiar with the control program, operation of the microscope is very time-consuming or not possible at all.

Standard solutions for operating microscopes with only a few selection operations have hitherto not been achieved on account of the multiplicity of applications and sample types in microscopy.

One approach is known from DE 10 2012 220 195 A1 which proposes a microscope having a control device which has an apparatus for capturing gestures of a user and for converting the captured gestures into control commands.

So that the gestures can be unambiguously captured, they must be carried out within a capture region of the apparatus and with a clarity which is sufficient for capture and must possibly be carried out repeatedly.

SUMMARY

The invention is based on the object of proposing a possibility which makes it possible to control a microscope in a simplified manner. The invention is also based on the object of specifying a microscope which can be controlled in a simple manner.

With respect to the method, the object is achieved by means of a microscope control method having the technical features according to claim 1. With respect to the microscope, the object is achieved by means of the features of claim 15.

The microscope control method is used to operate a microscope and can include the following steps of: capturing an item of acoustic, graphically represented and/or electronically coded voice information, in particular by means of a detector, an optical capture unit and/or an interface; comparing the voice information with stored reference commands and determining a voice command on the basis of a predetermined degree of correspondence between at least one section of the voice information and a reference command; selecting that reference command to which the voice command corresponds at least to a predetermined degree; generating at least one control command suitable for operating the microscope, wherein the control command is either an invariable control command assigned to the selected reference command or the control command is generated on the basis of a rule assigned to the reference command for forming a generated control command, and controlling the microscope by means of the assigned or generated control command.

An item of voice information is understood as meaning an item of information which is given by a transmitter of the voice information and can be understood by a receiver. In this case, the voice information can come from any spoken or written language. The voice information is not an item of information which can be directly used to control the microscope. In particular, an item of information in a so-called machine language is not an item of voice information in the sense of this description. In any case, an item of voice information requires translation into a machine language suitable for controlling the microscope, in particular a machine language suitable for controlling the illumination and/or drive units of the microscope.

The voice information may be spoken and is captured acoustically, for example by means of a detector in the form of a microphone.

An item of graphically represented voice information can be given by a static character, for example a graphic, a symbol, a letter, a number or a word, even if the voice information is graphically represented only occasionally, for example on a display. The graphical voice information may also be a concatenation of characters in the form of a character string. In one special form, the graphical voice information is text. The graphical voice information can be represented in an optically perceptible manner in any desired way and may be written, printed, projected or displayed, for example. The graphical voice information can be captured optically, for example by means of a camera.

If the acoustic voice information and/or the graphical voice information is in the form of an electronic file, for example a text file or a graphics file, the voice information can be referred to as electronically coded voice information. An item of electronically coded voice information also can be, for example, a file, the data in which represent an item of acoustic voice information, for example a sonogram. The electronically coded voice information can be captured by means of a suitable receiving device, for example by means of a computer unit, an infrared receiver or a radio receiver.

A voice command is understood as meaning an instruction, the meaning of which is aimed at the targeted performance of a control operation of the microscope. An item of voice information may be completely formed by one or more voice commands. In addition to the information which is not relevant to controlling the microscope, for example filler words, the voice information may also contain one or more voice commands.

A compound voice command can include at least two tones, tone sequences, characters or electronically coded data contained in the voice information.

A reference command is understood as meaning a generic term of a number of possible forms of expression of a phrase or term. The following expressions are mentioned merely as examples: "move in Z", "block in Z"; "height adjustment" and "corrected Z distance" which are all assigned or can be assigned to the one reference command "Z adjustment", for example. By means of a control command assigned to the reference command, the objective is moved in the Z-direction and an observation or scanning ray, for example, is defocused or focused.

Such an assignment can be carried out, for example, by comparing a number of previously known terms, which are each assigned to a reference command, with the captured voice information. Additionally or alternatively, it is possible to use an algorithm, by means of which the terms contained in the voice information are compared with one of the available reference commands with regard to their similarity with respect to their phonetics, meaning and/or character similarity.

The reference command, to which the terms are most similar, can be selected when the similarity has reached or exceeded a predetermined minimum degree.

In another possible configuration of the method, the captured voice information can be analyzed, and at least one probable future sequence of the method can be determined on the basis of the captured voice information.

If a plurality of probable future sequences of the method are determined, they can be advantageously indicated, in particular displayed, to the user. In this case, the sequences can be indicated in a manner sorted according to their probabilities. The desired sequence is selected manually and/or acoustically by the user.

In each of the probable future sequences, it is advantageously possible to provide method steps which do not have to be explicitly instructed by the user in order to be carried out.

Such a configuration of the method makes it possible to carry out the method without all method steps having to be instructed by the user. Therefore, the user does not require any comprehensive knowledge of the method to be used and its specific implementation, but rather can explain the experiment to be carried out in a conversation, for example. The voice information captured in this case can be converted into a voice command which is used to generate at least one control command, in particular a generated control command, which, in addition to the directly instructed method steps, codes further required method steps. For example, the obligatory use of a particular filter may be provided even though its use has not been expressly instructed by the user, but said use can be useful or even absolutely essential for carrying out the method.

Each reference command can be representative of a control command, upon the transmission of which a specific control operation is carried out on the microscope. A plurality of reference commands may be assigned to one control command.

An invariable control command which is always executed in the same manner may be assigned to a reference command. An invariable control command can be, for example, "STOP" which is used to stop all functions of the microscope, in particular all movements currently being carried out.

It is also possible to assign a rule for forming a generated control command to the reference command. In this case, the control command can be generated according to the rule after the reference command has been selected. The generated control command may contain variable components, with the result that it is not always executed in the same manner, as explained in yet more detail below.

In another configuration of the microscope control method, the captured voice information can be checked for the presence of at least one item of parameter information. An item of parameter information can be a section of the voice information which is connected to the determined voice command in a logical manner in terms of control. For example "move in Z" has been selected as the voice command and "height adjustment" has been selected as the reference command. An item of parameter information logically associated with this control command in terms of control can be, for example, the direction of the height adjustment and/or the absolute value or the step width of the height adjustment. The parameter information can be part of a compound voice command or a variable component of a generated control command.

In one possible configuration of the method, the determined voice command can be combined with at least one item of available parameter information to form a compound voice command, and the selected reference command can be supplemented with the parameter information to form a generated control command. The generated control command therefore can have a component determined by the reference command and at least one component determined by an item of parameter information.

The parameter information can be, for example, an item of information selected from a group consisting of a statement of location, a statement of direction, a distance, an absolute value or a step width, an identification of an element of the microscope and a parameter value.

In further configurations of the microscope control method, the voice command can be determined on the basis of known keywords contained in the voice information.

Keywords can be terms or combinations of terms, characters and/or numbers which are held in a database and are technical terms which are conventional in the field of microscopy, for example. The keywords can be held in a plurality of languages.

In contrast to the above-described procedure of determining the voice command on the basis of the meaning and/or the context of the components of the voice information, the use of keywords allows the voice command to be determined more quickly and in a more precise manner since unambiguous and previously known meanings are present in the voice information as a result of the keywords.

The database may be in the form of a so-called look-up table. In further embodiments, the databases may be formed by suitable logical structures. These structures define, for example, additional properties which provide an algorithm with important suggestions when interpreting the voice information.

An assignment rule, which is used to identify parameter information belonging to the keyword in the voice information and is used to combine the keyword with the parameter information to form a compound voice command, can be allocated to determined and selected keywords in an item of voice information.

If a keyword is identified in the captured voice information and an item of parameter information, for example, belongs to the keyword, the captured voice information can be searched for the parameter information in order to obtain a complete reference command and a generated control command which is logical in terms of control. In this case, it is possible to take into account whether the parameter information can be expected directly before or after the keyword or remote from the latter during conventional use of the language of the voice information.

In a further configuration of the microscope control method, the voice information can be checked for the presence of a spatial and/or temporal sequence of keywords at least in a section of the voice information, wherein, if the sequence of keywords is present, this sequence can be determined as the voice command.

The sequence of keywords can be compared, for example, with a number of reference commands in the form of predetermined activation states of the microscope (configurations) in response to the presence of correspondence.

At least that section of the voice information which contains the sequence can be assigned to that activation state to which the sequence corresponds at least to a predetermined degree, that is to say is sufficiently similar or identical thereto.

As a result of an activation state, a state of the microscope can be set in only one voice command, which can otherwise be achieved only by means of a multiplicity of individual voice commands. For example, the microscope can be changed from any desired current operating state to an initial state by means of a sequence of keywords representing a corresponding activation state.

Discrete parameter values which are parameter information belonging to the keyword can be combined in the stored and held predetermined activation states to form ranges of parameter values. Such combination requires less storage space than storage of all possible parameter values.

In further possible configurations, the microscope control method can be carried out in a more efficient manner if a selection of reference commands is made from a totality of initially available reference commands, in which case only the selected reference commands may be used to determine the voice command.

The techniques described herein solve the technical problem of setting a configuration of a complex instrument, such as a microscope, on the basis of captured measured values, here in the form of captured voice commands. The technical means used for this purpose are detectors, at least one optical capture unit and/or at least one interface for capturing measured values, a computer and control unit, and units of the microscope which are to be activated.

The object is also achieved by means of a microscope having a computer and control unit.

In the microscope, the computer and control unit is designed to compare an item of acoustic, graphically represented and/or electronically coded voice information with stored reference commands and to determine a voice command on the basis of a predetermined degree of correspondence between at least one section of the voice information and a reference command. It is then possible to select that reference command, to which the voice command corresponds to a predetermined degree.

The computer and control unit can be also designed to generate at least one control command suitable for operating the microscope, wherein the control command is either an invariable control command assigned to the selected reference command or the control command is generated on the basis of a rule assigned to the reference command for forming a generated control command. The microscope can be controlled by the computer and control unit by means of the assigned or generated control command.

An assigned or generated control command may be constructed in such a manner that said control command or respective particular parts of the control command is/are used or can be used to activate a number of units of the microscope, for example motor drives, adjustable filters, spatial light modulators (SLM), acousto-optical modulators (AOM), detectors and/or a light source (complex control command, compound control command).

If a control command has a plurality of parts or subcommands which are used to control different units, they can be assigned or generated on the basis of the current operating state of the microscope or of the respective unit to be activated. A high degree of responsiveness of the method for controlling the microscope can be achieved by taking into account current operating states. Current operating states can be captured using suitable sensors and can be evaluated by means of a suitably configured computing unit and can be provided for the method.

In order to control the microscope, the latter can have at least one motor drive which can be activated by means of a control command. If there are a plurality of drives on the microscope, a plurality of control commands can also be accordingly assigned or generated instead of one complex control command.

A practical use of the method from the field of cell biology shall be explained below on the basis of an example:

An experiment with fluorescence recording is intended to be carried out, for example. The aim of the experiment is to investigate the functional role of a particular protein during cell division.

The experiment involves observing the protein in conjunction with a further protein during cell division using confocal fluorescence microscopy. These two proteins are specifically marked for this purpose, which can be carried out genetically or in fixed cells with antibody stains, for example. The two fluorophores EGFP and mCherry, both proteins, are used for marking, for example.

The experimenter would now like to observe aspects of the cell division in a three-dimensional manner over time and writes down his measurement protocol, for example, for his new students or for the technical assistance briefly as follows:

"Please use confocal microscopy to examine the live cell samples with EGFP and mCherry. A volume of up to approximately 10 μm from the cover glass every five seconds. Laser power <2% since otherwise the cells suffer. Field of view of 50 μm should suffice. Observation period should be approximately three hours."

The voice information is read aloud, optically captured or electronically read into the computing and control unit.

When carrying out the method, the words and groups of words "live cell"; "EGFP"; "mCherry"; "confocal"; "every five seconds"; "volume of up to approximately 10 μm from the cover glass"; "laser power <2%"; field of view of approximately 50 μm"; "observation period" and "three hours", for example, are identified as voice commands and keywords from the above voice information.

A complex control command is assigned or generated from the voice commands, their context and the included statements with regard to volume, laser power, field of view size and observation period, for example. In further configurations, many individual control commands are accordingly assigned or generated.

The identified voice commands and keywords are a first stage of the method. However, this identified information is not sufficiently accurate, without useful basic settings, to control the microscope. For example, any suggestion of the spatial resolution is missing, and only the field of view has been specified. The sensitivity of the detector is also unknown.

A clear device setting results if basic settings or presettings of the variables which are still required are assigned to the identified keywords. For example, laser lines of 488 nm and 561 nm with a laser power of <2% are used. Available detection filters are automatically adapted to the dye emission spectra of these laser lines.

A held objective of the microscope which can handle a field of view of the desired size with diffraction-limited resolution, for example 40×1.2 W, is selected. A time series in which an image stack with diffraction-limited resolution is scanned in all three dimensions every five seconds over three hours is also defined. In this case, the scanned volume is 50 µm×50 µm×10 µm. A sensitivity of the detector used is set to a preset value.

In another embodiment of the microscope, the computer and control unit can be designed to carry out a plausibility check of a control command to be generated or a generated control command before it is executed.

BRIEF DESCRIPTION OF THE DRAWING

The invention is explained in more detail below on the basis of exemplary embodiments and a figure. In the figure:

FIG. 2 shows a flow chart of a process for controlling operation of a microscope.

DETAILED DESCRIPTION

Figure 1:
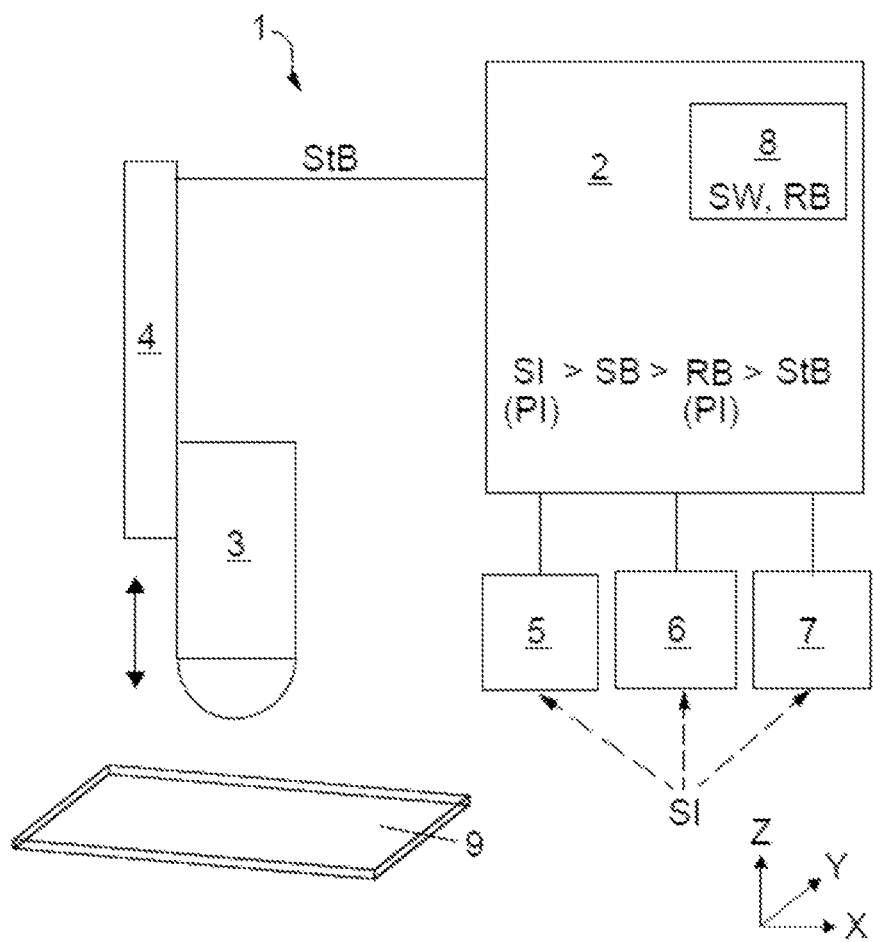
FIG. 1 shows a schematic illustration of a first exemplary embodiment of a microscope according to the invention.

In an exemplary embodiment illustrated in FIG. 1, a microscope 1 can include a computer and control unit 2, an objective 3 and an objective drive 4 for adjusting the objective 3.

The computer and control unit 2 can be connected to a detector 5 (e.g., in the form of a microphone) for capturing acoustic information, in particular acoustic voice information SI. An optical capture unit 6 (e.g., in the form of a camera) and an interface 7 can each be connected to the computer and control unit 2 in a form suitable for interchanging data.

The optical capture unit 6 is designed to optically capture graphically represented voice information SI and can include, for example, a CCD camera, a CMOS camera or a video camera.

In further embodiments of the microscope 1, the optical capture unit 6 can include a scanner.

The interface 7 is designed to capture electronically encoded voice information SI.

The computer and control unit 2 can have an integrated database 8 which stores reference commands RB, control commands StB and/or keywords SW in a repeatedly retrievable manner.

In another possible embodiment, the database 8 can be programmable; in particular, the reference commands RB, control commands StB and/or keywords SW stored in the database 8 can be supplemented, deleted and/or changed by a user of the microscope 1 or by means of a self-learning program.

In further embodiments of the microscope 1, the database 8 can be formed outside the computer and control unit 2 and can be connected to the control unit 2 in a manner suitable for interchanging data.

The objective drive 4 can be activated and the objective 3 can be adjusted in the Z-direction Z by means of the computer and control unit 2. Adjusting the objective 3 in the Z-direction Z changes its distance to an object plane 9 in which a sample to be examined under a microscope can be arranged, for example.

The computer and control unit 2 can be designed to compare the acoustic, graphically represented and/or electronically coded voice information SI with the stored reference commands RB and to determine a voice command SB on the basis of a predetermined degree of correspondence between at least one section of the voice information SI and one of the reference commands RB. It is then possible to select that reference command RB, to which the voice command SB corresponds to a predetermined degree.

The computer and control unit 2 also can be designed to generate at least one control command StB suitable for operating the microscope, wherein the control command StB is either an invariable control command StB assigned to the selected reference command RB or the control command StB is generated on the basis of a rule assigned to the reference command RB for forming a generated control command StB. The microscope 1 can be controlled by the computer and control unit 2 by means of the assigned or generated control command StB.

The method is described, by way of example, below on the basis of the exemplary embodiment of a microscope 1 illustrated in FIG. 1.

An item of acoustic voice information SI can be acoustically captured by means of the microphone 5.

Additionally or alternatively, an item of graphically represented voice information SI, which has the same meaning as the acoustic voice information SI, can be captured, for example read in or photocopied, by means of the optical capture unit 6. The graphically represented voice information SI may be a graphic, an image of at least one word, at least one character and/or at least one number. The graphically represented voice information SI may also be captured from a document, for example, a handwritten or printed memo.

In addition, or as an alternative, to the acoustic voice information SI and/or the graphically represented voice information SI, an item of electronically coded voice information SI likewise can be captured by means of the interface 7. The electronically coded voice information SI can include a text file, for example, an electronic short message (SMS, MMS), an email, a file of a write program or a file of a graphics program.

The captured voice information SI can be transmitted to the computer and control unit 2 and is converted there into a format which makes it possible to analyze the captured voice information SI.

The captured voice information SI can be subdivided into individual units, for example, into individual words, characters and/or numbers, by means of a suitable program. The voice information SI subdivided in this manner is analyzed and is investigated for the presence of voice commands SB.

In one possible configuration of the method, the voice information SI can be investigated in this case for constellations of words, characters and/or numbers and the meaning thereof is determined. This procedure can be carried out, for example, according to the concept of latent semantic indexing (LSI) which is known from the prior art. In the concept of LSI, a term being searched for need not itself be included in the voice information, but rather it can be investigated whether a sufficient degree of relevance to the term being searched for is found.

Filler words such as "and", "is" etc. contained in the voice information SI can be identified in one configuration of the method and not taken into account when determining a voice command SB.

In a further concept which is used as an alternative or in addition to LSI, keywords SW are searched for in the captured voice information SI. The keywords can include, for example, technical terms and frequently used abbreviations from the field of microscopy which are frequently used, for example, to describe experiments in the technical literature such as scientific publications or textbooks.

Such terms can relate, for example, to contrast methods (for example fluorescence, DIC, digital interference contrast), parameters for setting a microscope (for example detector gain, laser power, filters), fluorescent dyes (for example GFP, Alexa 488) and recording modes (for example z-stack, multi-channel image).

For each keyword SW, the database 8 may contain the information relating to whether at least one item of parameter information PI, which is used to specify the term of the keyword SW, is expected before or after the keyword SW.

For example, the term "zoom 5" can be found in the captured voice information SI. On the basis of the analysis of the captured voice information SI and the comparison with the database 8, "zoom" is identified as a keyword SW. The information stating that a number is usually stated after the keyword SW as parameter information PI, which is used to state the magnification factor (zoom factor), is linked to the keyword SW "zoom". In this case, the number "5" follows the keyword SW "zoom". The keyword SW "zoom 5" can be therefore identified and can be stored in the database 8 as a reference command RB.

In this case, the reference command RB assigned to the keyword SW can be "zoom 5". In another configuration of the method, the reference command RB is stored as "zoom 0-10", for example. The parameter information PI falls into the parameter range of the reference command RB stated in this manner and a very high degree of correspondence between the keyword SW and the reference command RB is therefore determined. The reference command RB then can be selected and the presence of a voice command SB, which is verified by the very high degree of correspondence, can be determined.

A rule for forming a control command StB can be assigned to the selected reference command RB. On the basis of the rule, the control command StB with a fixed component "zoom" and a variable component "5" can be generated in a machine language suitable for controlling the objective drive 4.

In another embodiment of the microscope 1, the computer and control unit 2 can be designed to carry out a plausibility check of the generated control command StB before it is executed. In this case, it is checked whether the generated control command StB is within the technical specifications of the microscope 1, for example whether 5× magnification is actually possible.

It is also possible to check whether the generated control command StB fits logically into the technological sequence of examination under a microscope which has been carried out up to this time.

If the generated control command StB is classified as plausible, it can be executed. If there is no plausibility, the execution of the generated control command StB can be either aborted or the control command can be not executed at all in the first place. If there is a lack of plausibility, it is also possible for a confirmation of the generated control command StB by the user of the microscope 1 to be requested and for the generated control command StB to be executed only after confirmation has been given.

On the basis of the generated control command StB, the objective 3 can be moved by the activated objective drive 4 in the Z-direction Z of a Cartesian coordinate system until 5× magnification has been set.

In further configurations of the method, the captured voice information SI can be analyzed in different variants.

For example, the keywords SW can be analyzed sequentially. In this case, prior knowledge of sequences of keywords SW which occur can be used to improve the quality of the analysis, in particular the correct determination of the voice commands SB.

Approaches involving pattern recognition in multidimensional space can be used for this purpose, for example. Activation states (configurations) of the microscope 1 are stored in a space (dictionary space) for this purpose, for example. A nearest neighbor, that is to say an activation state which is as similar as possible to a sequence of keywords SW, can be searched for in the space.

In order to implement fast analysis, preferably in real time, the dimensionality of the space can be reduced in further configurations of the method.

Principal component analyses, for example, can be used to reduce the dimensionality. Existing a-priori knowledge can also be used to subdivide the space used for analysis into subspaces. Only selected subspaces are then searched during the analysis and the analysis is therefore accelerated. Alternatively or additionally, it can be possible to make a selection of the reference commands RB, on the basis of which the presence of a voice command SB is determined.

FIG. 2 shows a flow chart of a process 200 for controlling operation of a microscope. The process 200 includes capturing an item of acoustic, graphically represented and/or electronically coded voice information by means of a detector, an optical capture unit and/or an interface (202), comparing the voice information with stored reference commands and determining a voice command on the basis of a predetermined degree of correspondence between at least one section of the voice information and a reference command (204), selecting that reference command to which the voice command corresponds at least to a predetermined degree (206), generating at least one control command suitable for operating the microscope, wherein the control command is either an invariable control command assigned to the selected reference command or the control command is generated on the basis of a rule assigned to the reference command for forming a generated control command (208), and controlling the microscope by means of the assigned or generated control command (210).

The invention claimed is:

1. A microscope control method for operating a microscope, the method comprising:
   capturing an item of acoustic, graphically represented and/or electronically coded voice information (SI) by means of a detector, an optical capture unit and/or an interface;
   comparing the voice information (SI) with stored reference commands (RB) and determining a voice command (SB) on the basis of a predetermined degree of correspondence between at least one section of the voice information (SI) and a reference command (RB);
   selecting that reference command (RB) to which the voice command (SB) corresponds at least to a predetermined degree;
   generating at least one control command (StB) suitable for operating the microscope, wherein the control command (StB) is either an invariable control command (StB) assigned to the selected reference command (RB) or the control command (StB) is generated on the basis of a rule assigned to the reference command (RB) for forming a generated control command (StB) and wherein the control command (StB) includes a plurality of parts or subcommands to control a plurality of different units of the microscope and the control command (StB) is assigned or generated based on a current operation state of the microscope or of the respective units to be activated; and controlling the microscope by means of the assigned or generated control command (StB) including the plurality of parts or subcommands to control the different units of the microscope.

2. The microscope control method of claim 1, wherein the graphically represented voice information (SI) includes a character, a character string or text.

3. The microscope control method of claim 1, wherein the electronically coded voice information (SI) includes a text file or a sonogram.

4. The microscope control method of claim 1, wherein the captured voice information (SI) is checked for the presence of at least one item of parameter information (PI).

5. The microscope control method of claim 4, wherein the parameter information (PI) includes an item of information selected from a group consisting of a statement of location, a statement of direction, a distance, an absolute value or a step width, an identification of an element of the microscope, and a parameter value.

6. The microscope control method of claim 4, wherein the determined voice command (SB) is combined with at least one item of available parameter information (PI) to form a compound voice command (StB), and the selected reference command (RB) is supplemented with the parameter information (PI) to form a generated control command (StB).

7. The microscope control method of claim 1, wherein the voice command (SB) is determined on the basis of known keywords (SW) contained in the voice information (SI).

8. The microscope control method of claim 7, wherein an assignment rule, which is used to identify parameter information (PI) belonging to the keyword (SW) in the voice information (SI) and is used to combine the keyword (SW) with the parameter information (PI) to form a compound voice command (SB), is allocated to selected keywords (SW).

9. The microscope control method of claim 7, wherein the voice information (SI) is checked for the presence of a spatial and/or temporal sequence of keywords (SW) at least in a section of the voice information (SI), wherein, if the sequence of keywords (SW) is present, it is determined as the voice command (SB).

10. The microscope control method of claim 9, wherein the sequence of keywords (SW) is compared with a number of reference commands (RB) in the form of predetermined activation states of the microscope in response to the presence of correspondence, and at least that section of the voice information (SI) which contains the sequence is assigned to that activation state to which the sequence corresponds at least to a predetermined degree.

11. The microscope control method of claim 10, wherein discrete parameter values of parameter information (PI) belonging to the keyword (SW) are combined in the predetermined activation states to form ranges of parameter values.

12. The microscope control method of claim 1, wherein the captured voice information (SI) is analyzed, and at least one probable future sequence of the method is determined on the basis of the captured voice information (SI).

13. The microscope control method of claim 1, wherein a selection of reference commands (RB) is made from a totality of reference commands (RB), and the selected reference commands (RB) are used to determine the voice command (SB).

14. The microscope control method of claim 1, wherein before a control command (StB) is executed, it is checked for plausibility and the control command (StB) is not executed if there is a lack of plausibility.

15. The microscope control method of claim 1, wherein the plurality of different units of the microscope includes at least two units selected from: a motor drive of the microscope, an adjustable filter of the microscope, a spatial light modulator of the microscope, an acousto-optical modulator of the microscope, a detector of the microscope, and a light source of the microscope.

16. A microscope comprising:
a computer; and
a control unit,
wherein the control unit is designed:
to compare an item of acoustic, graphically represented and/or electronically coded voice information (SI) with stored reference commands (RB) and to determine a voice command (SB) on the basis of a predetermined degree of correspondence between at least one section of the voice information (SI) and a reference command (RB);
to select that reference command (RB) to which the voice command (SB) corresponds to a predetermined degree;
to generate at least one control command (StB) suitable for operating the microscope, wherein the control command (StB) is either an invariable control command (StB) assigned to the selected reference command (RB) or the control command (StB) is generated on the basis of a rule assigned to the reference command (RB) for forming a generated control command (StB) and wherein the control command (StB) includes a plurality of parts or subcommands to control a plurality of different units of the microscope and the control command (StB) is assigned or generated based on a current operation state of the microscope or of the respective unit to be activated; and
to control the microscope by means of the assigned or generated control command (StB) including the plurality of parts or subcommands to control the different units of the microscope.

17. The microscope of claim 16, wherein the computer and control unit are configured to carry out a plausibility check of a generated control command (StB) before it is executed.

18. The microscope of claim 16 wherein the plurality of different units of the microscope includes at least two units selected from: a motor drive of the microscope, an adjustable filter of the microscope, a spatial light modulator of the microscope, an acousto-optical modulator of the microscope, a detector of the microscope, and a light source of the microscope.

* * * * *